(12) United States Patent
Miao

(10) Patent No.: US 10,288,948 B2
(45) Date of Patent: May 14, 2019

(54) SPACER, A LIQUID CRYSTAL DISPLAY PANEL AND A DISPLAY DEVICE

(71) Applicants: Boe Technology Group Co., Ltd., Beijing (CN); Beijing Boe Display Technology Co., Ltd., Beijing (CN)

(72) Inventor: Qing Miao, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

(*) Notice: Subject to any disclaimer, the term of this patent is extended or adjusted under 35 U.S.C. 154(b) by 0 days.

(21) Appl. No.: 14/499,670

(22) Filed: Sep. 29, 2014

(65) Prior Publication Data

US 2015/0362782 A1 Dec. 17, 2015

(30) Foreign Application Priority Data

Jun. 13, 2014 (CN) .......................... 2014 1 0264374

(51) Int. Cl.
- *G02F 1/1339* (2006.01)
- *B32B 3/30* (2006.01)
- *B32B 27/08* (2006.01)

(52) U.S. Cl.
CPC ............ *G02F 1/13394* (2013.01); *B32B 3/30* (2013.01); *B32B 27/08* (2013.01);
(Continued)

(58) Field of Classification Search
CPC ........... H01L 29/41733; H01L 27/1244; H01L 27/1259; H01L 29/78603; H01L 27/12;
(Continued)

(56) References Cited

U.S. PATENT DOCUMENTS

2007/0247584 A1* 10/2007 Li ....................... G02F 1/13394
349/156
2008/0123030 A1* 5/2008 Song ............................ 349/110
(Continued)

FOREIGN PATENT DOCUMENTS

| CN | 1963606 | 5/2007 |
|---|---|---|
| CN | 102736311 | 10/2012 |

OTHER PUBLICATIONS

Office action from Chinese Application No. 201410264374.4 dated Mar. 14, 2016.
(Continued)

*Primary Examiner* — Tony Tran
(74) *Attorney, Agent, or Firm* — Calfee, Halter & Griswold LLP

(57) ABSTRACT

The embodiments of the disclosure provide a spacer, a liquid crystal display panel and a display device, and the spacer can ensure that it has a relative stability in the case of being under the action of an external force. The spacer comprises a first body and a second body disposed opposite to each other, one side of the first body close to the second body comprises at least one protrusion structure, and one side of the second body close to the first body comprises at least one groove structure, wherein the at least protrusion structure and the at least one groove structure match each other.

6 Claims, 2 Drawing Sheets

(52) U.S. Cl.
CPC ... *B32B 2307/402* (2013.01); *B32B 2457/202* (2013.01); *G02F 2001/13398* (2013.01); *Y10T 428/24521* (2015.01)

(58) Field of Classification Search
CPC ........... G02F 1/13394; G02F 1/136209; G02F 1/136286; G02F 1/133512; G02F 1/136213
See application file for complete search history.

(56) References Cited

U.S. PATENT DOCUMENTS

| | | | | |
|---|---|---|---|---|
| 2008/0259255 | A1* | 10/2008 | Chae et al. | 349/106 |
| 2009/0190084 | A1* | 7/2009 | Sun | 349/157 |
| 2014/0063420 | A1* | 3/2014 | Tsai | G02F 1/13394 349/106 |
| 2014/0307207 | A1* | 10/2014 | Ge | G02F 1/13394 349/106 |

OTHER PUBLICATIONS

Office action from Chinese Application No. 201410264374.4 dated Aug. 24, 2016.
Office Action from China Application No. 201410264374.4 dated Jan. 11, 2017.

* cited by examiner

SPACER, A LIQUID CRYSTAL DISPLAY PANEL AND A DISPLAY DEVICE

RELATED APPLICATIONS

The present application claims the benefit of Chinese Patent Application No. 201410264374.4, filed Jun. 13, 2014, the entire disclosure of which is incorporated herein by reference.

FIELD OF THE INVENTION

The disclosure relates to the field of display technologies, and in particular, to a spacer, a liquid crystal display panel and a display device.

BACKGROUND OF THE INVENTION

A liquid crystal display panel comprises an array substrate and a color film substrate which are assembled, and a liquid crystal layer between the two substrates. In the procedure of assembling of the array substrate and the color film substrate, it is necessary to keep the cell gap of the liquid crystal display panel by way of a spacer.

When a surface of the liquid crystal display panel is acted by an external force, an offset will happen to the spacer disposed on the color film substrate relative to a thin film transistor (TFT) disposed on the array substrate, and moreover, if the external force is too great, it will result in that the offset of the spacer exceeds an allowable moving range. For example, when the offset of the spacer exceeds an edge of the thin film transistor, the spacer cannot be restored to its initial status, even if the external force is withdrawn. Thus, it will result in that a light leakage phenomenon happens to the liquid crystal display panel, leading to an adverse display of touch mura.

Therefore, in the case of the liquid crystal display panel being under the action of an external force, for the display quality and effect of the liquid crystal display panel, it is important to guarantee that the offset of the spacer relative to the array substrate is within the allowable moving range.

SUMMARY OF THE INVENTION

An object of the disclosure is to provide a spacer which can overcome the above-mentioned drawbacks of the prior art, and which can ensure that it has a relative stability in the case of being under the action of an external force.

According to an aspect of the disclosure, there is provided a spacer, which comprises a first body and a second body disposed opposite to each other, one side of the first body close to the second body comprises at least one protrusion structure, and one side of the second body close to the first body comprises at least one groove structure, wherein the at least protrusion structure and the at least one groove structure match each other.

In such a spacer, since it is arranged to be a two-part structure comprising a first body and a second body disposed opposite to each other, and mutually matched protrusion structure and groove structure are disposed on the first body and the second body, respectively, after the protrusion structure and the groove structure engage with each other, it may be difficult for a relative movement to happen between the first body and the second body, and therefore guarantee that the spacer has a relative stability in the case of being under the action of an external force.

In an embodiment of the spacer according to the disclosure, the raised height of the protrusion structure equals the recessed depth of the groove structure. As such, it is not easy for the first body and the second body to slide out after they are combined, so as to guarantee the fastness of combination between them.

In an embodiment of the spacer according to the disclosure, for any group of mutually matched protrusion structure and groove structure, the minimum inner profile size of the groove structure is greater than the maximum outer profile size of the protrusion structure in the direction perpendicular to the raised height of the protrusion structure. As such, it is beneficial to the extension of the protrusion structure into the groove structure, so as to be able to realize the engagement between them.

In an embodiment of the spacer according to the disclosure, the maximum difference between the minimum inner profile size D of the groove structure and the maximum outer profile size d of the protrusion structure may be less than a predetermined threshold, e.g., less than the allowable moving range of the spacer, thereby guarantees that under the action of an external force, the relative movement between the first body and the second body may be kept within the allowable moving range of the spacer, and in turn avoids adverse consequences due to the offset of the spacer being too great.

In an embodiment of the spacer according to the disclosure, the shape of the protrusion structure may comprise any one of a zigzag, a cross or a polygon; the shape of the groove structure comprises any one of a zigzag, a cross or a polygon which matches the shape of the protrusion structure.

In an embodiment of the spacer according to the disclosure, the material of the spacer comprises a polymer material. The polymer material possesses advantages such as relatively high transmittance and certain resilience, etc., and therefore is relatively suitable for use as the spacer of a liquid crystal display panel.

According to another aspect of the disclosure, there is provided a liquid crystal display panel comprising an array substrate and a color film substrate which are assembled, wherein the liquid crystal display panel further comprises a spacer according to the disclosure.

In an embodiment of the liquid crystal display panel according to the disclosure, the first body of the spacer is located on the array substrate, and the second body of the spacer is located on the color film substrate; or the first body of the spacer is located on the color film substrate, and the second body of the spacer is located on the array substrate. Since the first body and the second body of the spacer are disposed on the array substrate and the color film substrate, respectively, and can engage with each other, the phenomenon that a relative movement happens between the array substrate and the color film substrate and cannot be recovered is avoided, and the accuracy of assembling between the array substrate and the color film substrate is guaranteed. In this way, the light leakage phenomenon of the liquid crystal display panel may be effectively prevented, and in turn an adverse display of touch mura may be avoided or mitigated.

In an embodiment of the liquid crystal display panel according to the disclosure, the shape of the spacer may be columnar, so as not to affect the display effect of the liquid crystal display panel.

In an embodiment of the liquid crystal display panel according to the disclosure, the array substrate comprises a plurality of pixel units arranged in an array, each pixel unit being arranged with a thin film transistor, wherein the columnar spacer corresponds to the position of the thin film transistor. Thereby, the accuracy of assembling between the array substrate and the color film substrate is guaranteed, the light leakage phenomenon of the liquid crystal display panel is effectively prevented, and in turn an adverse display of touch mura is avoided or mitigated.

In an embodiment of the liquid crystal display panel according to the disclosure, there is further comprised a bar-shaped pad formed together with the spacer, the bar-shaped pad may comprise two parts, one part is formed together with the first body of the spacer, the other part is formed together with the second body of the spacer, and the two parts of the bar-shaped pad may have the same structures as the first body and the second body of the spacer respectively. As such, the formation of the spacer has a good consistency with the formation of the bar-shaped pad technically, and thereby the complication of the process technology may be effectively avoided.

According to yet another aspect of the disclosure, there is provided a display device comprising a liquid crystal display panel described above.

BRIEF DESCRIPTION OF THE DRAWINGS

In order to more clearly illustrate various aspects, features and advantages of the technical solutions of the disclosure, the appended drawings of the embodiments of the disclosure will be introduced briefly in the following. Obviously, the following drawings are only some embodiments of the disclosure, and for those of ordinary skills in the art, other drawings may be obtained according to these drawings under the premise of not paying out creative work.

DETAILED DESCRIPTION OF THE DRAWINGS

Figure 1:
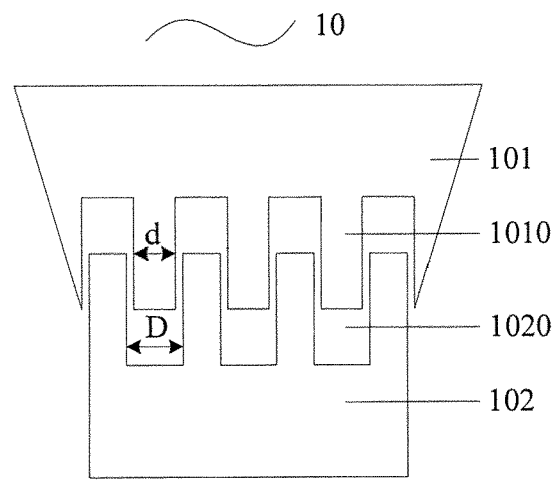
FIG. 1 shows a structure diagram of a spacer according to an embodiment of the disclosure.
Figure 2:
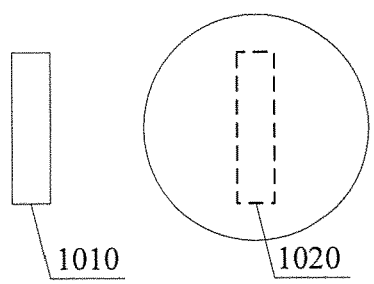
FIG. 2 shows a planar structure diagram of the protrusion structure and the groove structure of a spacer according to a first embodiment of the disclosure.
Figure 3:
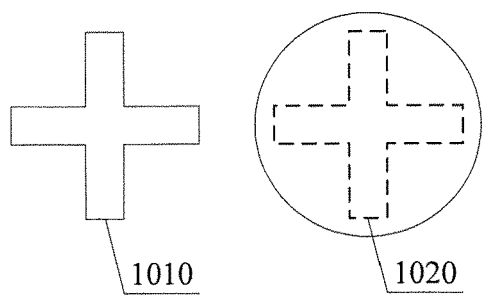
FIG. 3 shows a planar structure diagram of the protrusion structure and the groove structure of a spacer according to a second embodiment of the disclosure.
Figure 4:
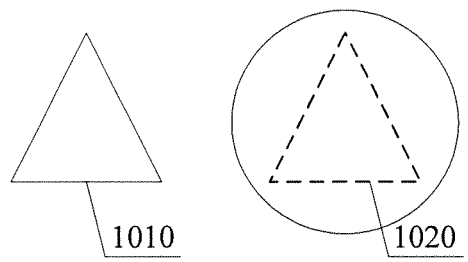
FIG. 4 shows a planar structure diagram of the protrusion structure and the groove structure of a spacer according to a third embodiment of the disclosure.
Figure 5:
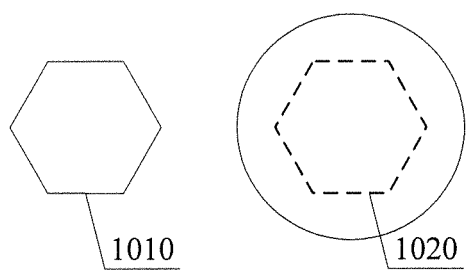
FIG. 5 shows a planar structure diagram of the protrusion structure and the groove structure of a spacer according to a fourth embodiment of the disclosure.

In the following, the technical solutions of the disclosure will be described clearly and completely in conjunction with the appended figures. Obviously, the described embodiments are only part of the embodiments of the disclosure, and not all of the embodiments. Based on the embodiments of the disclosure, all other embodiments obtained by those of ordinary skills in the art under the premise of not paying out creative work pertain to the protection scope of the disclosure.

The reference numerals in drawings are explained as follow: 10 spacer; 101 first body; 1010 protrusion structure; 102 second body; 1020 groove structure; 20 array substrate; 30 color film substrate.

FIG. 1 shows a structure diagram of a spacer 10 according to an embodiment of the disclosure. As shown in FIG. 1, the spacer 10 comprises a first body 101 and a second body 102 disposed opposite to each other, wherein one side of the first body 101 close to the second body 102 may comprise at least one protrusion structure 1010, one side of the second body 102 close to the first body 101 may comprise at least one groove structure 1020, and the at least protrusion structure 1010 and the at least one groove structure 1020 match each other.

In the spacer 10 as shown in FIG. 1, the following points should be noted.

First, a mutual engagement between both the first body and the second body may be implemented by a mutual match between the protrusion structure 1010 of the first body 101 and the groove structure 1020 of the second body 102.

Second, as shown in FIG. 1, in order to implement a mutual engagement, the protrusion structure 1010 and the groove structure 1020 are disposed at opposite positions between the first body 101 and the second body 102. Therein, there is oppositeness between the protrusion structure 1010 and the groove structure 1020. As shown in FIG. 1, on the first body 101, a groove shape appears between neighbor protrusion structures 1010; and on the second body 102, a protrusion shape appears between neighbor groove structures 1020. Therefore, in an embodiment of the disclosure, the definitions of the protrusion structure 1010 and the groove structure 1020 may be differentiated on the basis of their specific disposed positions (the first body 101 or the second body 102).

Third, the mutual match between the protrusion structure 1010 and the groove structure 1020 may in particular comprise match of shape, match of number, and match of positional relationship. For the embodiments of the disclosure, the shape and number of the protrusion structure 1010 and the groove structure 1020 are not particularly defined, namely, may be arbitrary shape and arbitrary number, as long as the two structures may match each other to implement engagement.

In the spacer 10 as shown in FIG. 1, since mutually matched protrusion structure 1010 and groove structure 1020 are disposed on the first body 101 and the second body 102, respectively, after the protrusion structure 1010 and the groove structure 1020 engage with each other, it may be difficult for a relative movement to happen between the first body 101 and the second body 102, or a relative movement can only happen within an allowable moving range, so that the spacer has a relative stability in the case of being under the action of an external force is guaranteed.

In the embodiment as shown in FIG. 1, the material of the spacer 10 may comprise a polymer material. The polymer material possesses advantages such as relatively high transmittance and certain resilience, etc., and therefore the spacer 10 may be made from the polymer material so as to avoid affecting the display effect.

In the spacer 10 as shown in FIG. 1, since the protrusion structure 1010 and the groove structure 1020 need to match each other in terms of shape, number, and positional relationship so as to realize engagement between them, in order to guarantee the fastness of combination (or engagement) between the first body 101 and the second body 102, the raised height of the protrusion structure 1010 can equal the recessed depth of the groove structure 1020. As such, there is a better match between the protrusion structure 1010 of the first body 101 and the groove structure 1020 of the second body 102, such that it is not easy for the first body 101 and the second body 102 to slide out after they are combined, and the fastness of combination between them is guaranteed.

In the spacer 10 shown in FIG. 1, as shown in FIG. 1, for any group of mutually matched protrusion structure 1010 and groove structure 1020, the minimum inner profile size D of the groove structure 1020 is greater than the maximum outer profile size d of the protrusion structure 1010 in the direction perpendicular to the raised height of the protrusion structure 1010 (or perpendicular to the recessed depth of the groove structure 1020). As such, in the procedure of mutual engagement between the protrusion structure 1010 and the groove structure 1020, it is beneficial to the extension of the protrusion structure 1010 into the groove structure 1020, so as to be able to realize the combination between them.

It should be noted that, obviously, the difference between the minimum inner profile size D of the groove structure 1020 and the maximum outer profile size d of the protrusion structure 1010 cannot be too great, and should be less than a predetermined threshold, which may, for example, be the allowable moving range of the spacer 10, thereby guarantees that under the action of an external force, the relative movement between the first body 101 and the second body 102 may be kept within the allowable moving range of the spacer 10, and in turn avoids adverse consequences due to the offset of the spacer 10 being too great, for example, light leakage of the liquid crystal panel.

FIGS. 2-5 show planar structure diagrams of the protrusion structure 1010 and the groove structure 1020 of a spacer 10 according to first to fourth embodiments of the disclosure, respectively. As shown in FIGS. 2 to 5, the shape of the protrusion structure 1010 may be any one of a zigzag, a cross or a polygon; correspondingly, the shape of the groove structure 1020 may be any one of a zigzag, a cross or a polygon which matches the shape of the protrusion structure 1010, wherein the polygon may be any one of a triangle, a pentagon, a hexagon, etc.

Of course, the actual shape of the protrusion structure 1010/groove structure 1020 is not limited thereto, and may further be any other shape. However, in view of the complexity of the preparation technologies, the shape of the protrusion structure 1010/groove structure 1020 is generally one of the above-mentioned shapes.

Figure 6:
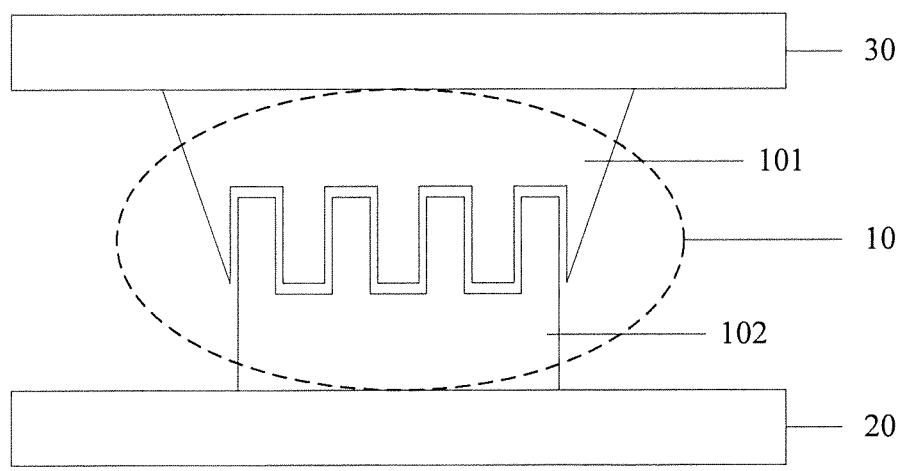
FIG. 6 shows a structure diagram of a liquid crystal display panel according to an embodiment of the disclosure.

FIG. 6 shows a structure diagram of a liquid crystal display panel according to an embodiment of the disclosure. As shown in FIG. 6, the liquid crystal display panel may comprise an array substrate 20 and a color film substrate 30 which are assembled, as well as a liquid crystal layer between the two substrates (not shown in FIG. 6). In addition, As shown in FIG. 6, the liquid crystal display panel may further comprise a spacer 10 according to an embodiment of the disclosure as shown in FIG. 1, for keeping the cell gap of the liquid crystal display panel.

In the embodiment as shown in FIG. 6, since the spacer 10 comprises two parts, the first body 101 and the second body 102, as shown in FIG. 6, the first body 101 and the second body 102 of the spacer 10 may be disposed on the color film substrate 30 and the array substrate 20, respectively, thereby realizing a mutual engagement between the protrusion structure of the first body 101 and the groove structure of the second body 102. In an alternative embodiment, a reverse arrangement is also feasible, namely, the first body 101 may be disposed on the array substrate 20, and correspondingly, the second body 102 may be disposed on the color film substrate 30.

Referring to the spacer 10 as shown in FIG. 1, in order to realize a mutual engagement, the protrusion structure 1010 and the groove structure 1020 should be disposed at opposite positions between the first body 101 and the second body 102. Accordingly, in the liquid crystal display panel shown in FIG. 6, as shown in FIG. 6, the protrusion structure of the spacer 10 may be disposed on one side of the first body 101 far from the color film substrate 30, whereas the groove structure of the spacer 10 may be disposed on one side of the second body 102 far from the array substrate 20. In an alternative embodiment, namely, in the case of the first body 101 being located on the array substrate 20 and the second body 102 being located on the color film substrate 30, the protrusion structure of the spacer 10 may be disposed on one side of the first is body 101 far from the array substrate 20, and the groove structure may be disposed on one side of the second body 102 far from the color film substrate 30.

Referring to the embodiment as shown in FIG. 1, in the spacer 10, the protrusion structure 1010 of the first body 101 and the groove structure 1020 of the second body 102 match each other and therefore may engage with each other, such that it is difficult for a relative movement to happen between the first body 101 and the second body 102, or a relative movement can only happen within an allowable moving range, and therefore that the spacer 10 has a relative stability in the case of being under the action of an external force is guaranteed. Hence, in the liquid crystal display panel as shown in FIG. 6 comprising the spacer 10 as shown in FIG. 1, when under the action of an external force, the liquid crystal display panel may prevent the shift of the spacer 10, or limit the offset of the spacer 10 within an allowable offset range. Consequently, the phenomenon that a relative movement happens between the array substrate 20 and the color film substrate 30 and cannot be recovered is avoided, and the accuracy of assembling between the array substrate 20 and the color film substrate 30 is guaranteed. As such, the light leakage phenomenon of the liquid crystal display panel may be effectively prevented, and thereby an adverse display of touch mura may be avoided or mitigated.

In the embodiment as shown in FIG. 6, the shape of the spacer 10 may be columnar. At this point, the disposed position of the columnar spacer 10 may correspond to the disposed position of the black matrix on the color film substrate 30. In such a case, the projection area of the columnar spacer 10 on the array substrate 20 or the color film substrate 30 is less than the area of the black matrix on the array substrate 20 or the color film substrate 30, and therefore, the columnar spacer 10 may be completely covered by the projection range of the black matrix, so as not to affect the display effect of the liquid crystal display panel.

In addition, the array substrate 20 may comprise a plurality of pixel units arranged in an array, each pixel unit being arranged with a thin film transistor. The columnar spacer 10 may correspond to the position of the thin film transistor. In particular, one of the first body 101 and the second body 102 may be disposed on the array substrate 20, and correspond to the position of the thin film transistor; the other of the first body 101 and the second body 102 may be disposed on the color film substrate 30, and also correspond to the position of the thin film transistor. Of course, the first body 101 and the second body 102 also need to correspond to each other. In such a case, when a relative offset happens between the first body 101 and the second body 102, since one of the first body 101 and the second body 102 is disposed on the array substrate 20, and corresponds to the position of the thin film transistor, the light leakage phenomenon of the liquid crystal display panel may be effectively prevented, and thereby an adverse display of touch mura may be avoided, as long as it is guaranteed that the relative offset of the other of the first body 101 and the second body 102 does not exceed an edge of the thin film transistor and thereby the accuracy of assembling between the array substrate 20 and the color film substrate 30 is guaranteed.

In addition, in the procedure of preparing the liquid crystal display panel, it is further needed that a bar-shaped pad is formed at least in the edge area of the array substrate 20 at the same time the spacer 10 is formed. Therein, the edge area of the array substrate 20 refers to an area on the array substrate 20 for disposing a driver integrated circuit (IC) and a flexible printed circuit (FPC).

In particular, in the actual production of the liquid crystal display panel, it is prepared taking the whole panel comprising a plurality of liquid crystal display panel unit as a unit, and so it is necessary to cut the whole panel so as to be able to form a plurality of stand-alone liquid crystal display panels. On this basis, for the liquid crystal display panel, the area of the array substrate 20 is larger than the area of the color film substrate 30, and therefore the damage to the array substrate in the procedure of cutting may be prevented by disposing a bar-shaped pad on the array substrate 20. Of course, alternatively, bar-shaped pads may be disposed on both the array substrate 20 and the color film substrate 30 at the same time.

Therefore, the bar-shaped pad may be formed together with the spacer 10. The bar-shaped pad may comprise two parts, one part is formed together with the first body 101 of the spacer 10, and the other part is formed together with the second body 102 of the spacer 10. Moreover, the two parts of the bar-shaped pad may have the same structures as the first body 101 and the second body 102 of the spacer 10 respectively, namely, the protrusion structure and the groove structure which matches each other so as to engage with each other. As such, the formation of the spacer 10 has a good consistency with the formation of the bar-shaped pad technically, and thereby the complication of the process technology may be effectively avoided.

It should be noted that, in the case of the bar-shaped pad being formed together with the spacer 10, the two parts of the bar-shaped pad will be formed on the array substrate 20 and the color film substrate 30 respectively, and the positional relationships of the two parts correspond to each other. On this basis, one part of the bar-shaped pad formed on the color film substrate 30 will be cut out in the procedure of cutting, whereas the other part of the bar-shaped pad formed on the array substrate 20 may be selected to be removed after the completion of cutting.

An embodiment of the disclosure further provides a display device comprising a liquid crystal display panel described above.

What are described above are just specific embodiments of the disclosure, however, the protection scope of the disclosure is not limited thereto. Variations or alternatives easily occurring to any artisan familiar with the technical field within the technical scope disclosed by the disclosure should be encompassed within the protection scope of the disclosure. Therefore, the protection scope of the disclosure should be subject to the protection scope of the claims.

It should be noted that, in the claims, the use of verbs "comprise/contain" and their conjugations does not preclude the presence of an element or step not stated in a claim. The word "a" or "an" does not preclude a plurality.

The invention claimed is:

1. A spacer for a liquid crystal display panel having an array substrate and a color film substrate, the array substrate comprising a plurality of pixel units arranged in an array, each pixel unit being arranged with a thin film transistor, the spacer comprising:
  a first columnar body attached to the color film substrate and extending toward the array substrate, the first columnar body comprising a plurality of protrusion structures disposed on a side of the first columnar body facing the array substrate; and
  a second columnar body disposed opposite the first columnar body, the second columnar body being attached to the array substrate and extending toward the color film substrate, the second columnar body comprising a plurality of groove structures disposed on a side of the second columnar body facing the color film substrate; and
  a bar-shaped pad formed together with the spacer, the bar-shaped pad comprising:
    a first part formed together with the first columnar body on the color film substrate and having the same structures as the first columnar body; and
    a second part formed together with the second columnar body on the array substrate and having the same structures as the second columnar body;
  wherein the positional relationships of the first and second parts of the bar-shaped pad correspond to each other;
  wherein the first columnar body and the second columnar body are overlapping with each other in a direction perpendicular to the array substrate;
  wherein the end of the first columnar body is in direct contact with the end of the second columnar body;
  wherein each of the plurality of protrusion structures is arranged in each of the plurality of groove structures in a one-to-one correspondence;
  wherein the first columnar body and the second columnar body correspond to the position of the thin film transistor;
  wherein the first columnar body and the second columnar body are formed from the same polymer material; and
  wherein a raised height of the protrusion structure equals a recessed depth of the groove structure.

2. The spacer according to claim 1, wherein for each pair of protrusion and groove structures, the minimum inner profile size of the groove structure is greater than the maximum outer profile size of the protrusion structure in the direction perpendicular to the raised height of the protrusion structure.

3. The spacer according to claim 2, wherein the difference between the minimum inner profile size of the groove structure and the maximum outer profile size of the protrusion structure is less than a predetermined threshold.

4. The spacer according to claim 1, wherein the shape of the protrusion structure comprises any one of a zigzag, a cross or a polygon; and
  the shape of the groove structure comprises any one of a zigzag, a cross or a polygon which matches the shape of the protrusion structure.

5. A liquid crystal display panel comprising an array substrate and a color film substrate which are assembled, wherein the liquid crystal display panel further comprises the spacer according to claim 1.

6. A display device comprising the liquid crystal display panel according to claim 5.

* * * * *